Figure 1:
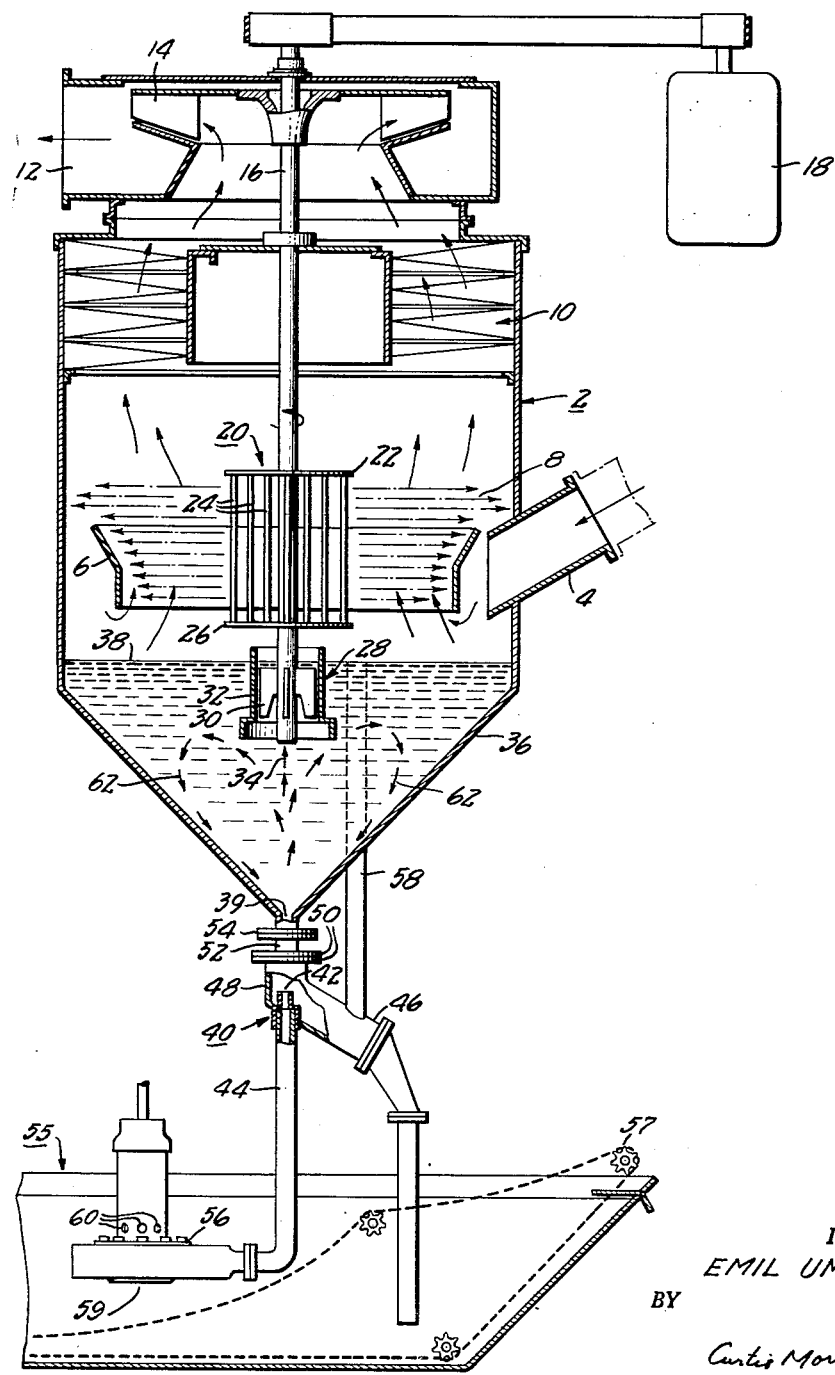

Dec. 5, 1961  E. UMBRICHT  3,011,769
GAS WASHER AND LIQUID INJECTOR TYPE SLUDGE REMOVER
Filed Dec. 21, 1953  2 Sheets-Sheet 1

INVENTOR.
EMIL UMBRICHT
BY
Curtis Morris Safford
ATTORNEYS

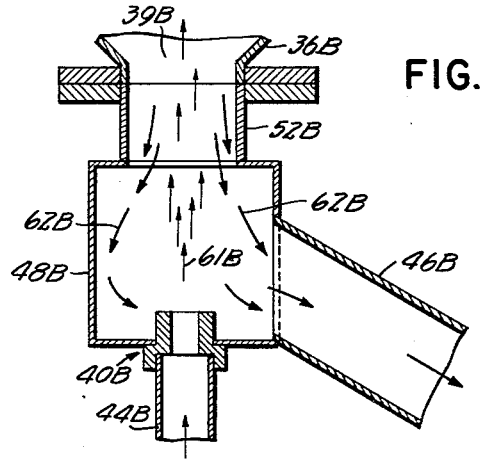
FIG. 2.
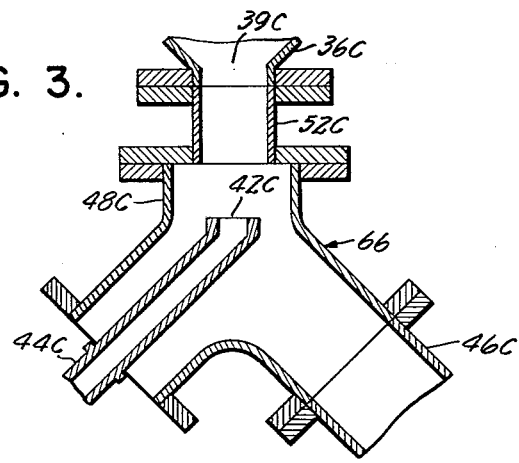
FIG. 3.
FIG. 4.
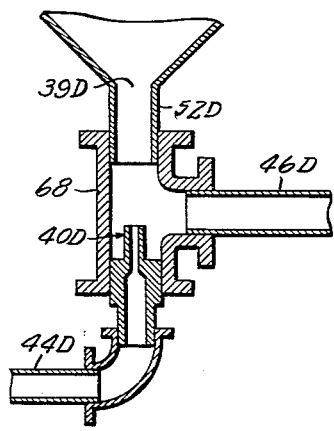
INVENTOR.
EMIL UMBRICHT
BY
ATTORNEYS

United States Patent Office 3,011,769
Patented Dec. 5, 1961

3,011,769
GAS WASHER AND LIQUID INJECTOR
TYPE SLUDGE REMOVER
Emil Umbricht, Jackson, Mich., assignor to Ajem
Laboratories, Inc., Detroit, Mich.
Filed Dec. 21, 1953, Ser. No. 399,438
7 Claims. (Cl. 261—3)

This invention relates to a gas washer and to the continuous hydraulic removal of sludge or other solid materials from an air-washing or other gas-washing type collection unit by means of controlled turbulent flow.

In a preferred embodiment of the invention, the water reservoir of an air-washing unit is arranged with conical or sloping walls which converge toward an opening at the bottom of the tank. An unconfined jet of water or other liquid is squirted through this opening into the tank under sufficient pressure and in sufficient volume to maintain the level within the reservoir at some predetermined height well above the bottom opening. An exit for the liquid and collected sludge is provided through the same opening so that the sludge materials may be carried away to a separate tank where they can be collected or separated from the liquids, or disposed of in any desired manner.

Various mechanical devices have been proposed for removing the sludge materials from air washers and wet type dust collectors, for example, scrapers, chains, screws and other mechanical arrangements have been used. However, such devices ordinarily require the presence of a relatively large volume of liquid and the mechanical sludge removing devices are bulky. In many installations sufficient room is not available to provide a water reservoir having sufficiently large capacity for such operation. The use of a smaller amount of liquid creates other problems in connection with the disposal of the waste. For one thing, the sludge tends to be more concentrated and has more of a tendency to stick to the side walls of the tank and, although detergents and surface-active agents are helpful to prevent such settling and caking, many types of sludge are difficult to remove. In addition, if only a small volume of water is used, the liquid in the reservoir may become too hot for satisfactory operation. This is particularly true where hot gases, such as those from furnace or foundry operations are being washed.

Tanks having cone-shaped bottom portions with an outlet at the apex of the cone are particularly likely to clog because of the concentration of sludge materials at the outlet. The present invention provides positive and continuous protection against such clogging without the use of moving mechanical parts.

In apparatus embodying the present invention, a storage tank may be provided at a substantial distance from the air-washer, if desired, or the sludge may be collected by sedimentation, filtering or otherwise. The liquid is re-circulated so that the advantages of a large volume of liquid are obtained without requiring excessive space at the location of the particle-collecting apparatus. Several air-washers or dust collectors may be connected to the same separation or storage tank, thus minimizing the capital investment and maintenance cost. Because of the arrangement of the tank and the continuously controlled turbulent flow of liquid, the units are self-draining. Thus for example where air-washers are subjected to freezing temperatures, as when they are installed on the roof of a building there is no necessity to drain the air-washer when it is not in use because the unit will automatically drain whenever it is turned off and, therefore, no freezing problems are encountered.

In other applications, air-washers and dust collectors are used to collect dangerous particles from the atmosphere, for example particles which are radioactive or chemically active. It is undesirable to permit a concentration of such particles to be collected in the air-washer unit. With the present invention, these particles are continuously removed to a remote storage tank and after separation of the particles, the liquid is re-circulated through the washing system.

The following description from which various objects and advantages of the invention will be apparent, considered in conjunction with the accompanying drawings, describes in more detail several examples of such continuous hydraulic sludge-removal systems in which continuous turbulent liquid flow is utilized to remove the sludge materials.

In the drawings:

FIGURE 1 shows a vertical, sectional view through an air-washer unit which embodies the hydraulic sludge removal system of the present invention, and illustrates diagrammatically a tank for collecting the sludge materials; and FIGURES 2, 3 and 4 illustrate other arrangements of the jet-feed and drain system of the liquid reservoir.

In the air-washer of FIGURE 1, the air which contains the particles which are to be collected enters a cylindrical chamber, generally indicated at 2, through an entrance duct 4. The air is distributed around the unit by means of a suitable baffle arrangement, such as is illustrated diagrammatically at 6, and passes upwardly through a dense radial spray of water 8 which covers the entire area of the spray chamber. The air then passes through a series of baffles or moisture eliminators diagrammatically indicated at 10, which remove any particles of moisture from the air and allow the water to drip back into the chamber 2. The air then passes upwardly toward the top of the unit and is forced outwardly through discharge duct 12 by means of a fan or blower 14.

The fan 14 is supported by a vertical shaft 16 which extends through the center of the unit and which is driven by an electric motor 18. The shaft 16 extends downwardly below the fan 14 and carries a spray-generating cage, generally indicated at 20, which produces the spray of water by which the dust particles are collected. The cage 20 includes a top disc 22 which is secured to and rotates with the shaft 16. A number of vertically extending rods 24 are secured at spaced positions around the periphery of the disc 22 and extend vertically downwardly therefrom. These rods are joined at the bottom by an annular ring 26. A pump or impeller, generally indicated at 28, is positioned below the cage 20 and is arranged to throw water upwardly within the interior of the cage 20. This impeller includes four outwardly extending blades 30 which are secured to the vertical shaft 16 and are positioned below the level of the water in the bottom part of the chamber 2. A sleeve 32 surrounds the blades 30 so that as the blades 30 rotate, water which enters through an opening 34 at the bottom of the sleeve 32 is thrown upwardly to the full height of the cage 20 and against the disc 22. The rapidly rotating cage 20 then throws this water centrifugally outwardly, creating a fine dense spray. The impeller 28 throws the water upwardly in a conical stream so that a uniform spray is produced across the entire area of the chamber.

The lower portion of the chamber 2 is conical in shape, as indicated by the sloping bottom walls 36. In order to maintain the level of the water within the chamber 2 at the desired height, which is indicated by a broken line 38, water is continuously fed upwardly through an opening 39 in the bottom of the tank 2. This opening 39 serves both as an inlet and as an outlet. A nozzle assembly, generally indicated at 40, is positioned below the tank opening 39 and is arranged to direct a jet of liquid directly upwardly into the conical portion of the tank 2. In the illustrated embodiment, the nozzle assembly 40 includes an orifice 42 that is at the end of a supply pipe 44. The nozzle assembly 40 extends upwardly through a sloping drain pipe 46 into a vertical housing 48 of substantially larger diameter than the opening 39. The orifice 42 is positioned below the opening 39 and is arranged to direct a jet of liquid through the opening 39, the diameter of the unconfined jet where it enters the opening 39 being substantially smaller than that of the opening 39. The housing 48 is secured by two flanges 50 to a short length of pipe 52 of smaller diameter which in turn is secured by flanges 54 to the bottom portion of the container 2. The opposite end of the pipe 46 is connected to a suitable drainage system or sludge separation tank, for example such as is indicated diagrammatically at 55. For example, the tank 55 may include a conveyor-type sludge removing system diagrammatically indicated at 57, which continuously removes the sludge which gathers by settling in the tank 55. The supernatant liquid above the sludge is drawn off by a pump 56 which is connected to the supply pipe 44 and provides the necessary pressure to form the jet within the conical portion 36 of the tank 2. This pump, as shown, is immersed in the liquid and has its inlet through a central opening 59 in the bottom of the pump. Openings 60 in the housing below the liquid level serve to equalize the level within the supporting housing and surrounding it. This pump is more particularly described and claimed in my copending application Serial No. 357,450, filed May 26, 1953, now issued as Patent No. 2,890,660, and although advantageous in this connection, is not essential to the present invention, but other available pumps may be used. The maximum level of the liquid within the tank 2 is limited by an overflow pipe 58 which extends upwardly within the tank 2 and is connected to the drain pipe 46.

The jet of water which is fed into the tank 2 is adjusted in such manner that it is slightly greater than the amount of liquid which flows outwardly through the opening 39, so that a small amount of liquid continuously flows through the overflow pipe 58. In some instances it is desirable to have a substantial flow through the pipe 58, particularly where very heavy sludge is being handled and a greater dilution is desired in the drain pipe 46.

With this arrangement the water from the incoming jet flows upwardly through the center of the conical portion 36 of the tank and then, as indicated by the arrows 62, flows outwardly and downwardly around the outer portion of the incoming stream of water and out through the same opening 39 and thence outwardly through the drain pipe 48. The flow of water within the conical portion of the tank 36 preferably is turbulent in nature so as to maintain the particles of dust or other solids in a state of continuous agitation to prevent their settling or caking along the sides of the tank 36.

It will be noted also that the intake at 34 to the impeller 28 is positioned directly above and within the incoming jet of water so that the water which is distributed by means of the cage 20 contains a minimum of suspended matter.

FIGURE 2 shows a modified jet feed and drain arrangement which is adapted for use with the air-washer of FIGURE 1 or with other apparatus, and in which parts corresponding to those of FIGURE 1 are given corresponding numbers followed by the suffix "B." In this example, a rectangular box or housing 48B is positioned directly beneath the opening 39B in the bottom of the conical portion 36B of the tank 2, the box being connected to the lower end of a short length of pipe 52B. The drain pipe 46B opens into one side of the box 48B whereas the nozzle assembly 40B which is connected to the supply pipe 44B feeds into the bottom of the box 48B. The incoming stream of water is designated by the arrows 61B whereas the water which exits through the opening 39B is indicated by the arrows 62B.

FIGURE 3 shows another arrangement in which parts corresponding to those of FIGURES 1 and 2 are given corresponding numbers followed by the suffix "C." A Y-section of pipe 66, the upper portion of which serves as a housing 48C, is secured to the lower end of the pipe section 52C. One leg of this Y is connected to a drain pipe 46C and the other leg of the Y is connected to the supply line 44C. The supply line 44C extends through into the interior of the left-hand leg of the Y and is provided with an orifice 42C positioned directly below the opening 39C in the bottom of the tank 2.

Another arrangement is shown in FIGURE 4 in which parts corresponding to similar parts in the other drawings have been given corresponding numbers followed by the suffix "D." The short length of pipe 52D is secured to a T-section of pipe which forms the housing 68, the side outlet of which is connected to a drain pipe 46D and the bottom opening of which is connected to the supply pipe 44D, the nozzle assembly 40D extending upwardly within the T-section 68 to about the level of the drain pipe 46D and being directed toward the opening 39D in the bottom of the tank 2. In general, the dimensions of the system are not critical and will depend to a certain extent upon the amount of water in the system, upon the nature and consistency of the sludge materials that are to be collected and upon the size of the equipment. The opening of the orifice 42 frequency is between ½ and 1¼ inches in diameter. The opening 39 in the bottom of the tank 2 might, for example, be between 1½ and 4 inches in diameter. The end of the orifice 42 will usually be positioned below the opening 39 by a distance equal to once or twice the diameter of the tank opening 39.

It will be apparent that the lower section of the tank 2 preferably is circular in cross-section but that it can be rectangular, hexagonal or of other shape if desired, the important feature being that the walls 36 are sufficiently sloping to permit the suspended particles to be readily carried away with the wash.

When the water supply to the tank 2 is cut off, for example by stopping the pump 56 (FIGURE 1), all of the water remaining within the cone portion 36 of the tank drains through the pipe 46 into the tank 55, therefore there is no danger of the system freezing when it is shut down and subjected to freezing temperature.

From the foregoing, it will be apparent that the invention is well-adapted to carry out the ends and objects hereinbefore set forth and to be economically manufactured since the parts and components of the system are easily constructed of readily available parts by well-known fabrication techniques. It will be apparent that other types of particle-collection apparatus can be employed or that the sludge may be fed into a separate hopper, such as the portion 36 of the container 2 having the sloping side-walls. It will be appreciated that gas washing as used in the following claims is intended to include the washing of air laden with dust, paint particles, vapor, fumes, or smoke or other contaminating agents.

I claim:

1. A sludge handling system and gas washing apparatus comprising a container, means for conducting a gas to be washed through said container, apparatus in said container for washing the gas, a tank at the bottom of said container having downwardly converging sloping side-walls and an opening at the bottom thereof, said sidewalls defining a conical chamber therein opening upwardly into said gas-washing container, the interior of said conical chamber being open, said bottom opening being at the lowest point of said conical chamber, whereby all of the liquid in said conical chamber can drain out through said bottom opening, a nozzle assembly having an orifice positioned below said opening and directed upwardly through said opening and arranged when connected to a source of liquid under pressure to direct a jet of liquid upwardly through said opening into said tank, a housing around said orifice extending above said orifice and being connected to said side-walls around said bottom opening, said jet of liquid being directed upwardly through the center of said housing and through the center of said bottom opening and continuing up through the center of said conical chamber, said bottom opening having a diameter in the range from three to eight times the diameter of said orifice, an overflow passage communicating with said conical chamber near the top thereof, and an outlet pipe connected to said housing, said conical chamber having an annular drain region therein surrounding said central jet of liquid, the sludge and liquid therein flowing downwardly along said sloping side-walls in said drain region and draining down to said outlet pipe through said bottom opening and housing in an annular pattern around said jet and counter to the direction of said jet, said jet continuously supplying liquid to said conical chamber and maintaining the level up to said overflow passage.

2. A sludge handling system and gas washing apparatus comprising means for washing a gas, a container beneath said gas-washing means and having a bottom opening and converging walls sloping downwardly toward said opening, said converging walls defining a downwardly converging liquid reservoir which has an open interior above said opening, a nozzle assembly outside said container having an orifice spaced from and positioned below said opening and directed upwardly through said opening, drainage means arranged to collect liquid discharged from said container through said opening, particle separation means connected to said drainage means for separating the solid materials from the liquid discharged from said container, and pump means connected to said particle separation means and said nozzle assembly to force liquid continuously from said separation means to said orifice and jet the liquid from said orifice into said tank upwardly through said opening, said jet of liquid having a smaller cross-sectional area than said opening, said jet passing vertically up through the center of said opening and extending up through the center of said liquid reservoir, second pump means for supplying said gas-washing means, said second pump means having an intake communicating with said liquid reservoir, said jet of liquid maintaining the level of liquid in said reservoir above said intake, said downwardly converging walls defining an annular space within said liquid reservoir around said central jet, the liquid and sludge in said annular space draining down counter to said jet into said drainage means through the annular space in said opening which surrounds said jet.

3. A sludge handling system and gas-washing apparatus comprising a container having means for conducting a gas therethrough and means for washing the gas therein, and a tank beneath said container, said tank having a bottom opening and converging walls sloping downwardly toward said opening, said tank defining a conical chamber which is open at the top and which opens up into said container, an overflow conduit opening into said tank near the top of said conical chamber, a nozzle assembly having an orifice spaced from and positioned below said opening and directed upwardly through said opening, means to collect liquid discharged from said container through said opening, and pump means connected to said collection means and said nozzle assembly to force liquid continuously from said collection means to said orifice and jetting the liquid from said orifice into said tank upwardly through said opening, said jet of liquid having a smaller diameter than the diameter of said opening and extending up through the center of said conical chamber, said downwardly sloping walls defining an annular drain space surrounding the jet of liquid in said chamber, said annular drain space extending down through said opening around the jet, said jet maintaining the liquid level in said chamber up to said overflow conduit, and sludge and liquid draining down through said annular drain space counter to upwardly flowing jet.

4. A sludge handling system and gas washing apparatus comprising a container having a gas-washing chamber therein and means in said chamber for washing gas passing therethrough, said container defining a liquid reservoir beneath said gas-washing chamber and opening upwardly into said chamber, said reservoir having a bottom opening and walls converging downwardly toward said opening said reservoir having an overflow near the top thereof, said bottom opening being at the lowest point of said reservoir, and jet forming means positioned below said opening and arranged to produce a narrow vertical conical jet of liquid flowing upwardly through said opening into said reservoir, said jet extending vertically up through the center of said reservoir, the liquid in said reservoir having a level at said overflow, said jet having a smaller cross sectional area at said bottom opening than the cross sectional area of the bottom opening so as to permit liquid from said reservoir to flow downwardly from said container opposite to the direction of flow of said jet through the same opening through which the liquid in the jet is passing into said reservoir, said downwardly flowing liquid having an annular pattern surrounding said vertical jet, said jet having sufficient force and capacity to maintain said liquid level in said reservoir at said overflow, all of the liquid in said container draining out through said bottom opening in the absence of said jet.

5. In a gas-washing system for collecting solid particles, apparatus comprising a container defining a passage for gas, means for washing gas in said passage, a tank beneath said container and opening upwardly into said container, said tank having sloping side-walls converging downwardly and an opening at the bottom thereof and an overflow therefrom near the top, a nozzle assembly having an orifice positioned below and directed upwardly through said opening, a housing around said orifice having a cross-sectional area larger than that of said opening, drainage means connected to said housing, particle separation means connected to said drainage means, and pump means connected to the liquid after processing in said particle separation means and to said nozzle assembly to re-circulate liquid under pressure to said nozzle assembly and produce a jet of liquid moving upwardly through said opening into said container, said jet passing upwardly through the center of said bottom opening and having a smaller cross-sectional area than said bottom opening, said jet moving continuously up along a straight line through the center of said tank and holding the liquid level in said tank up to said overflow, the sludge and liquid in said tank continuously draining down through said bottom opening around said jet into said housing and to said drainage means, whereby sludge is prevented from sticking to the inside of said tank.

6. Improved sludge removal, liquid injection means and gas washing apparatus including walls defining a gas washing chamber, rotatable spray-generating means near the center of said chamber arranged to generate a high velocity spray of liquid droplets radiating therefrom, a rotatable pump impeller below said spray generating means for throwing liquid upwardly to said spray-generating means, and a casing around said impeller having a bottom intake, said improved sludge removal and liquid injection means including walls having converging portions below said gas washing chamber and defining a liquid reservoir having an opening at the bottom thereof, a nozzle assembly below said opening arranged to send liquid upwardly through said opening to support liquid in said reservoir above said intake of the pump casing while allowing sludge material to drain through said opening, said nozzle assembly being aimed at the intake of the pump casing, whereby said impeller is supplied with liquid being sent upwardly by said nozzle.

7. Improved sludge removal, liquid injection means and gas washing apparatus including walls defining a gas washing chamber, rotatable spray-generating means near the center of said chamber arranged to generate a high velocity spray of liquid droplets radiating therefrom, a rotatable pump impeller below said spray generating means for pumping liquid upwardly to said spray-generating means, a casing around said impeller having a first intake said improved sludge removal and liquid injection means including walls having conveying portions below said gas washing chamber and defining portions of a liquid reservoir having an opening at the bottom thereof, a jet assembly below said opening and directed to send liquid upwardly through said opening to support liquid in said reservoir above said intake to said pump casing, said upwardly directed liquid having a cross sectional area substantially less than the size of said opening and allowing sludge-containing liquid to flow down out of said opening in an annular pattern around said upwardly directed liquid, first drainage means arranged to collect said sludge-containing liquid discharged through said opening, sludge separation means below said reservoir connected to said drainage means for separating the sludge from the liquid discharged through said opening, pump means having a second intake communicating with the liquid in said sludge separation means and supplying liquid under pressure to force liquid continuously from said separation means to said jet assembly and providing said upwardly directed liquid, second liquid drainage means communicating with said reservoir above said first pump intake and defining the top level of the liquid in said reservoir, said second drainage means returning liquid from the top of said reservoir to said sludge separation means, and sludge removal apparatus associated with said sludge separation means.

References Cited in the file of this patent

UNITED STATES PATENTS

| | | |
|---|---|---|
| 353,775 | Booraem | Dec. 7, 1886 |
| 780,133 | Schirmer | Jan. 17, 1905 |
| 1,031,113 | Garred | July 2, 1912 |
| 1,661,602 | Dary | Mar. 6, 1928 |
| 1,986,913 | Anthony | Jan. 8, 1935 |
| 2,165,364 | Ferngren | July 11, 1939 |
| 2,240,227 | Saussure | Apr. 29, 1941 |
| 2,246,674 | Gronemeyer | June 24, 1941 |
| 2,404,286 | Graham | July 16, 1946 |
| 2,573,008 | Gorden | Oct. 30, 1951 |
| 2,578,040 | Booth | Dec. 11, 1951 |
| 2,650,708 | Norton | Sept. 1, 1953 |